Nov. 8, 1960    I. D. WALLACH    2,959,072
POWER TRANSMISSION
Filed May 22, 1959    2 Sheets-Sheet 1
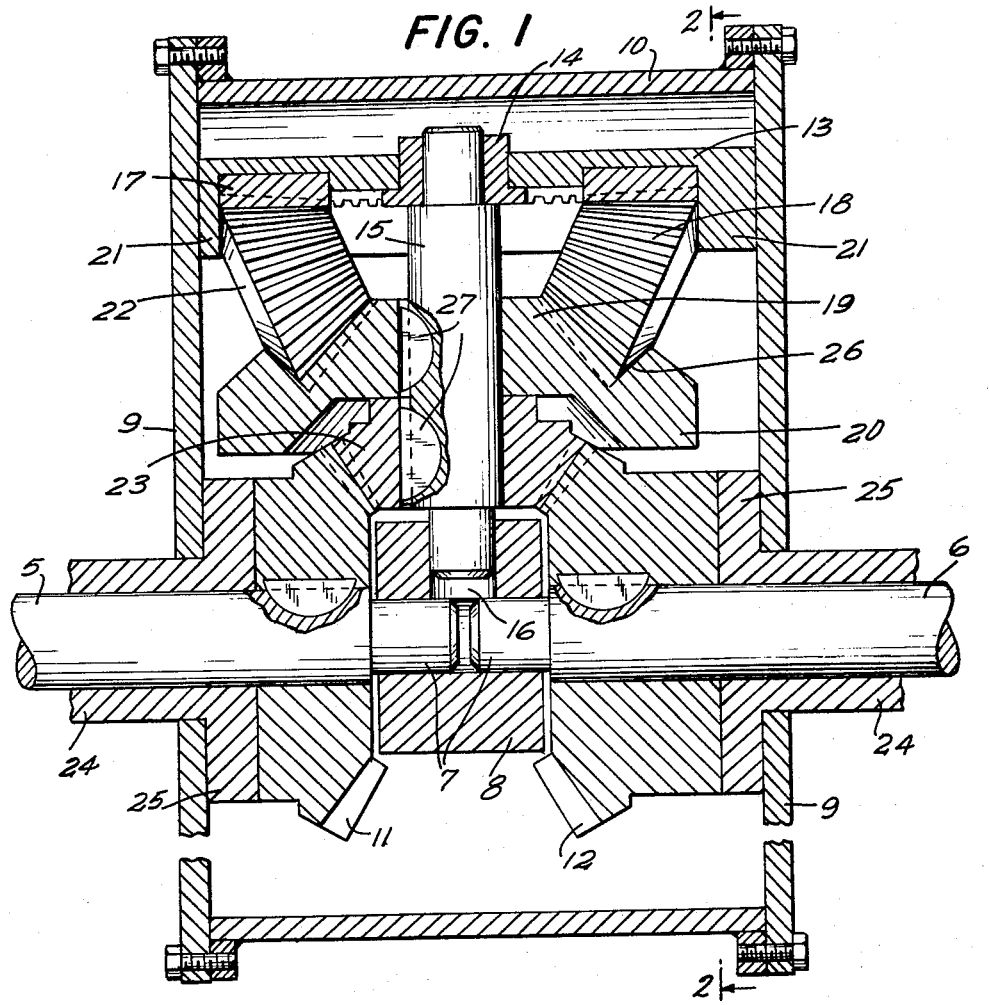
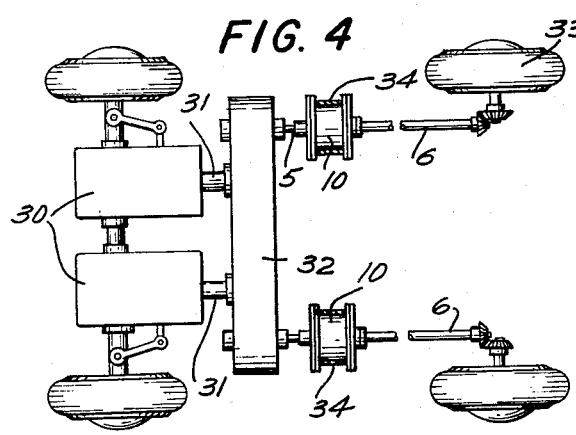
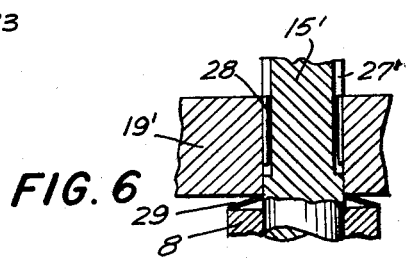
INVENTOR.
IRVING D. WALLACH
BY Kane, Dalsimer
and Kane
ATTORNEYS

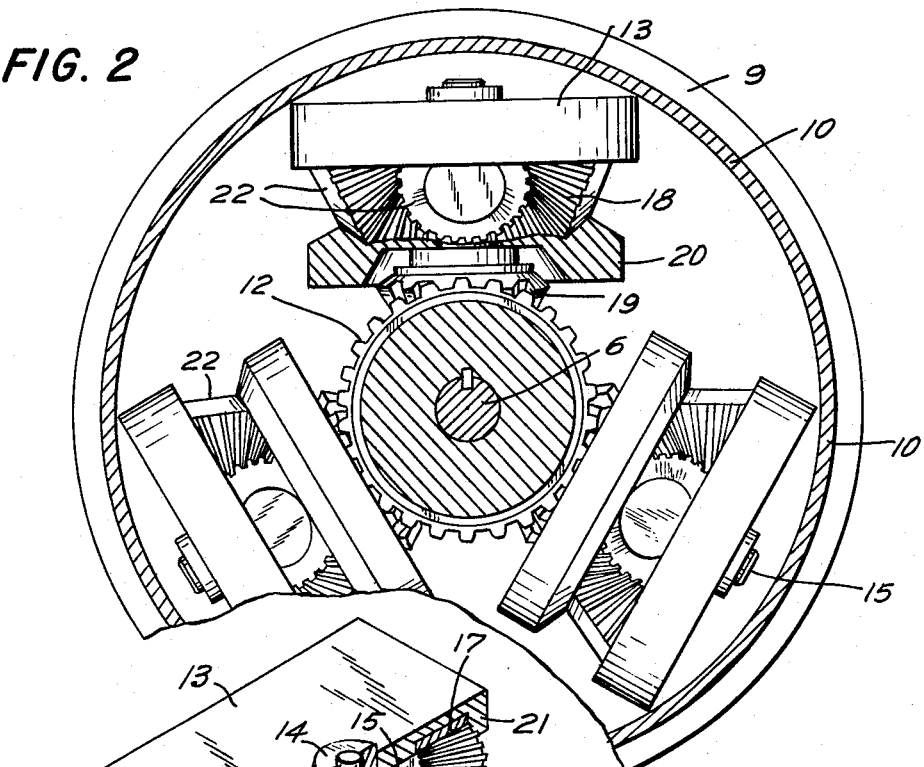
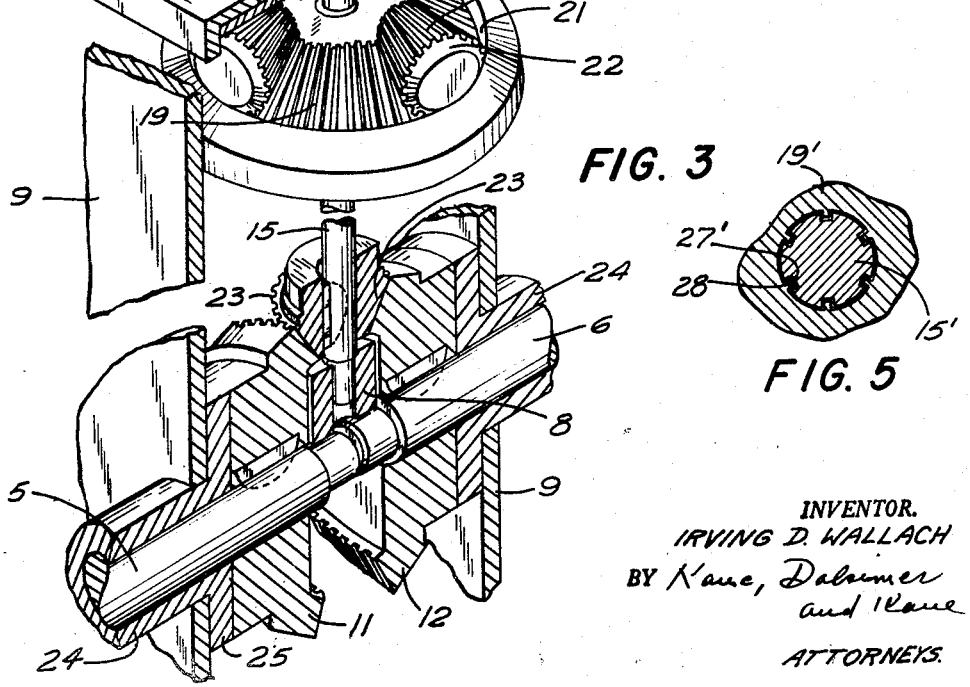

United States Patent Office 2,959,072
Patented Nov. 8, 1960

2,959,072

POWER TRANSMISSION

Irving D. Wallach, Cold Spring Harbor, N.Y., assignor to Conotorc Inc., Port Washington, N.Y., a corporation of New York Filed May 22, 1959, Ser. No. 815,028

12 Claims. (Cl. 74—751)

This invention relates to a structurally and functionally improved mechanism for mechanically transmitting power; apparatus constructed in accordance with the present teachings being of utility in miniature form for the transmission of power from fractional horsepower motors, and, in large form, being likewise of advantage under heavy drives involving hundreds of horsepower.

Irrespective of size, the present mechanism will provide a transmission of the automatic type, in which wear, noise and mechanical failures are reduced to a minimum, and in which coupling assemblies of the mechanism will have a high degree of mechanical advantage in their retarding action. Therefore, "lock-in" of the transmission is readily achieved under minimum torque conditions, and very little heat is generated during speeds of less than lock-in.

An additional object is that of providing a mechanism of simple design, and which will include relatively few parts, each individually simple and rugged in construction, those parts being capable of ready assembly to furnish a unitary apparatus of great flexibility and which will operate over long periods of time with freedom from all difficulties.

With these and other objects in mind, reference is had to the attached sheets of drawings illustrating practical embodiments of the invention, and in which:

Fig. 1 is a fragmentary sectional side view illustrative of one design of transmission;

Fig. 2 is a transverse sectional side view taken along the line 2—2 in the direction of the arrows as indicated in Fig. 1;

Fig. 3 is a partly sectional perspective view of one of the main series of coupling parts included in the mechanism;

Fig. 4 is a schematic and fragmentary plan view showing one manner in which transmissions embodying the present teachings may be included as part of a power-driven vehicle;

Fig. 5 is a fragmentary sectional plan view showing a preferred connection between one of the radially extending shafts and the bevel gear mounted thereby; and Fig. 6 is a fragmentary sectional side view of an alternative assembly.

In Figs. 1, 2 and 3, the numeral 5 indicates a driving shaft and 6 a driven shaft. These shafts are aligned with each other and have preferably reduced adjacent inner portions 7. The latter are conveniently encircled by a spider bearing 8 of suitable type. Enclosing this mechanism is a housing and supporting structure, which, as illustrated, may include side plates 9 mounting adjacent their outer edges an outer wall 10 of preferably circular shape. This mounting may be effected in any desirable manner, as by bolts. Gaskets and other suitable elements (not shown) may be employed to seal the housing structure 9–10.

Secured against movement one with respect to each of shafts 5 and 6 are bevel gears 11 and 12. Extending across the housing inwardly of its outer wall 10 is a support or raceway 13. This carries a bearing 14 at a point preferably midway of the side walls 9. A further shaft 15, conveniently having reduced end portions, extends radially of the main axis of the mechanism, as defined by shafts 5 and 6. Its outer end extends into and is supported by the bearing 14. Its inner end extends into a recess 16 formed in the spider bearing 8. In this manner, shaft 15 is maintained in proper alignment with bearing 14.

Concentrically disposed with respect to bearing 14 is a bevel gear 17. This gear may be affixed in any preferred manner against movement with respect to the raceway 13. Its teeth are engaged by the teeth of coupling elements in the form of pinion gears 18. Those pinions also have their teeth meshing with the teeth of a bevel gear 19. The latter is mounted by shaft 15 and is capable of limited axial movement relative to the latter. It is restrained from rotational movement with respect to shaft 15. A loading member in the form of a flywheel 20 may form an extension of bevel gear 19. The coupling elements or pinions 18 are in the form of truncated cones having angularly extending base surfaces 22. Those surfaces bear against adjacent surfaces of extensions 21 conveniently integral with the raceway 13.

A pinion gear 23 is carried by shaft 15 and is secured against movement with respect thereto. Therefore, this pinion will rotate in unison with bevel gear 19. The teeth of pinion 23 mesh with the teeth of bevel gears 11 and 12. The latter, together with shafts 5 and 6, are also maintained in alignment by suitable bearings 24, which may have flange portions 25 disposed to intervene gears 11 and 12 and the inner faces of the side members 9.

A shaft 15, bevel gears 17 and 19, cone elements or pinion gears 18, a flywheel 20 and pinion 23 constitute a coupling assembly for bevel gears 11 and 12. As shown in Fig. 2, three of these assemblies may be spaced around the axis of shafts 5 and 6. In that case, the axes of the further shafts 15 will be spaced 120° from each other. Obviously, this spacing may be varied, according to whether a greater or lesser number of assemblies are employed. As illustrated in Fig. 3, four coupling elements 18 may form parts of each assembly, and in that case are spaced 90° from each other. A greater or lesser number of elements 18 might be employed, with corresponding variation in the spacing. The base faces 22 of the elements, in addition to bearing against the inner faces of flange portions 21, bear against the surface of corresponding flange or extended portions 26 conveniently included as integral parts of the flywheel 20.

With a view to simplifying the illustration, keys have been shown for coupling bevel gears 11 and 12 with shafts 5 and 6 respectively. A key has also been shown for coupling pinion 23 with the further shaft 15. Similarly, a key structure shows pinion 19 mounted against rotation with respect to shaft 15. These keys have been indicated at 27. Pinion 23 will be fixed against movement axially of shaft 15. Bevel gear 19 will, by virtue of its key structure, be capable of limited axial movement along that further shaft.

In the case of a transmission having a diameter of, for example, 16", this movement may be on the order of .005" to .010". In lieu of the key structure at 27, and as illustrated in Fig. 5, shaft 15' may slidably mount gear 19' (corresponding to shaft 15 and gears 19 as aforedescribed) by means of a spline structure. To this end, the shaft is conveniently formed with axially extending grooves 27 into which projecting portions 28 of gear 19' extend. This has also been illustrated in Fig. 6. In that view there has additionally been shown a spring 29 of suitable type interposed between the gear 19' and the gear 23. This spring will serve to bias bevel gear 19' into firm mesh with pinions 18, and in turn will cause the teeth of the latter to bear against and overlap the teeth of bevel gear 17 to a maximum extent. In most instances, however, such spring pressure need not be employed. Accordingly, in a condition of rest, the pinions 18 of the coupling assemblies, when in the positions shown in Fig. 1, will have their teeth overlapping the teeth of bevel gear 17 to only a minimum extent.

A transmission assembly as afore described provides for a very effective loading of the pinions or cones 18. The transmission will be partially filled with oil. Driving force will be exerted by shaft 5. Assuming that the resistance to movement on the part of shaft 6 is sufficiently high, or with shaft 5 moving merely at idling speed, bevel gear 11 will drive the pinions 23 of the several coupling assemblies. This will result in shafts 15 of those assemblies rotating, to turn with them bevel gears 19. Under these circumstances, the cone elements or pinions 18 will simply rotate around the annular raceway provided by bevel gears 17. Housing 9—10 will rotate slowly if at all.

As the speed of rotation of shaft 5 is increased, the cone elements 18, supported solely by engagement with and between gears 17 and 19, still rotate at relatively slow speeds. This reduces the rate of wear and transmission noise, and due to the simplicity of the design, practically eliminates the danger of failure of accessory parts which are not present in the instant transmission assembly.

In the event it is found desirable, the number of cone elements or pinions 18 in a given coupling assembly may be increased or decreased without the necessity of redesigning or rebuilding. Under these circumstances, these elements will simply be properly spaced and will remain in such relationship to each other, because with the teeth present in the elements, there can be no slipping between the latter and bevel gears 17 and 19. By lessening the number of cone elements, the speed of "lock-in" is decreased. By increasing the number of those elements, the lock-in speed is increased.

Each coupling assembly has a high degree of mechanical advantage in its retarding action on the pinion gears 23. The degree of advantage is related to the ratio between the driving bevel gear 11 and the pinion gears 18. For example, if the latter have ten teeth each, and gears 11 and 12 each have forty teeth, then the cone assemblies will each be operating at a mechanical advantage of four to one. If three cone assemblies are present in each coupling, then lock-in will occur at one-twelfth the torque delivered by the power source. Accordingly, very little heat is generated at speeds less than the lock-in speed. Obviously, practically any mechanical advantage desired could be incorporated in a given design. Under these circumstances, heat control is assured.

A transmission such as the present may be employed to drive various types of mechanism in a controlled manner. In certain instances, the driving force exerted on shaft 5 might involve only a fraction of a horsepower. Under these circumstances, the parts of the transmission would be relatively small. The transmission is also of primary value when driving heavy loads, such as are involved in trucks.

In Fig. 4 there has been illustrated an application of the transmission to a dual-engine vehicle. In that view the numeral 30 designates the engines, from which drive shafts 31 extends. These connect with the elements of a suitable drive contained within a casing 32. Coupled to the driven elements of this drive are the shafts 5 of transmissions embodying the present teachings. The driven shafts 6 of those transmissions are suitably connected to driving wheels 33. Whether dual transmissions are employed, as in Fig. 4, or whether a single transmission is used, the members 10 of the housing structures are preferably encircled by bands 34 or other elements which will serve to prevent a rotation of the housing structures. To this end, and in conventional manners, if bands 34 are employed, suitable mechanisms for bringing them into contact with and constricting them around the surfaces 10 are provided. These mechanisms are in turn conveniently connected to, for example, a foot pedal or a hand lever, to shift them out of or into gripping engagement with the transmission housings.

With such an arrangement of mechanism, there is incorporated in power-driven vehicle design features not obtainable in present-day drives. In this connection it is primarily to be appreciated that by preventing rotation of the housing structure 9—10 by bands 34 or other suitable means, a reverse driving of shaft 6 is effected. If caterpillar drives are substituted for wheels 33, one transmission may be left in forward drive condition while the other is controlled to effect reverse driving. This will permit the vehicle to spin or rotate in its own length, regardless of whether a single engine or dual engines are employed. Where dual engines are used, they may be synchronized in any of a number of well-known manners. Each engine driving a separate transmission, it is feasible, in the event of failure of one engine, for the vehicle still to move. To this end, clutches (not shown) may be provided between the engines and the mechanism within casing 32 to disconnect either of the engines from that mechanism. "Knee action" rear suspension may readily be resorted to, since each rear wheel is independent of the other and not coupled thereto with a single rear axle and differential.

Where pivoted jacks are coupled to the frame or other suitable part of a vehicle, "run-on" jacking is entirely feasible in connection with the rear wheels in a manner similar to that heretofore existing in connection with front wheels. This is because a jack adjacent the wheel to be lifted may be dropped down so that its foot portion contacts the ground. Thereupon, power is available to back the truck, so that the jack will raise the vehicle at the desired location. By forward driving, the jack may, of course, be rendered inoperative. The central tunnel recess employed in most passenger vehicles today may be entirely eliminated, since the central propeller shaft is eliminated. With the transmission system as herein taught, the difficulties heretofore encountered in connection with four-wheel drives are completely overcome, in that each wheel will drive and compensate automatically and independently, according to the path followed and irregularities encountered, in that the wheels are not locked together.

As is apparent, with a load on shaft 6 which resists ready rotation of that shaft, a gradual increase in the speed of rotation of shaft 5 will cause the cone elements or pinions 18 to rotate at ever-increasing speeds. Under the action of centrifugal force at right angles to the axes of shafts 15, those elements will bear with increasing intimacy through their surfaces 22 against the adjacent faces of flange or extended portions 21. This will result in an increased tendency of the housing structure 9—10 to rotate. The oil torus which will build up ahead of the pinions 18 in their orbital paths will also tend to cause a rotation of the housing structure. Under heavy load conditions, and as the speed of rotation of shaft 5 is increased, the housing structure will begin to rotate, carrying with it all the coupling assemblies in an orbital path around shafts 5 and 6. Centrifugal forces will come into being in directions radial to the axes of the driving and driven shafts. With such forces created, the cone elements 18 will bear with increasing intimacy against the surfaces of the bevel gears 17. This effect will be enhanced due to the flywheel units provided at 20, which move as units with the bevel gears 19. Therefore, increasing resistance to rotation will be encountered by the cone elements, and as the momentum of shaft 6 increased, a "locked in" condition will be created in which shafts 5 and 6 will rotate in synchronism.

If an increase of the load on shaft 6 occurs (as in the case of a motor vehicle climbing a hill), then that shaft will gradually rotate at speeds slower than will shaft 5. This condition may be overcome, within the limits of power in a given assembly, by increasing the speed of rotation of shaft 5. If, however, the latter is held at a constant r.p.m., then if ever-increasing resistance is encountered, shaft 6 will be driven at a slower and slower rate, until a condition of balance is established. As the load on shaft 6 decreases, it will pick up speed, until it is again rotating in unison with shaft 5, conceding that the latter turns at an adequate speed. By retarding or arresting the movement of the housing structure 9—10, it is apparent that shaft 6 will be turned in a direction reverse to that of shaft 5. By careful control of housing structure movements, this result may be effectively employed to exert a braking force. If a vehicle is running down hill, or shaft 6 tends to overrun shaft 5, it is apparent that the transmission will exert a definite retarding effect on shaft 6. This will be because under these circumstances, the driving force on shaft 5 has been diminished or nullified. Under these conditions, shaft 6, through bevel gear 12, will rotate the pinions 23 of the coupling assemblies to drive bevel gears 19, and thus the cone elements around their raceways. This rotation of the parts will be transmitted through to bevel gear 11 as a definite retarding force.

Thus, among others, the several objects of the invention as specifically aforenoted are achieved. Obviously, numerous changes in construction and rearrangements of the parts may be resorted to without departing from the spirit of the invention as defined by the claims.

I claim:

1. In a transmission including rotatable driving and driven shafts, bevel gears respectively movable therewith and a supporting structure rotatable with respect to said shafts, coupling assemblies between such shafts and each including a pinion gear drivingly connected between said bevel gears, a further shaft extending radially with respect to said first-named shafts and driven by said pinion gear, a further pair of bevel gears spaced from and opposed to each other, means connecting one of said latter gears to rotate with said further shaft, the second of the same being fixedly mounted by said supporting structure and adapted for movement therewith, and rotatable cone elements having their axes extending radially of said further shaft, said elements being supported independently of that further shaft in positions between and in engagement with the surfaces of said further gears to increasingly bear under the action of centrifugal force against surfaces of the further gear mounted by said structure, and means for frictionally contacting said rotatable cone elements while said elements are bearing against said further gears providing braking for said cone elements.

2. In a transmission as defined in claim 1, said elements being formed with annular series of teeth meshing with the teeth of said further gears.

3. In a transmission as defined in claim 2, the further bevel gear connected to rotate with said further shaft being axially shiftable with respect to the latter toward such elements to force the teeth of the same into intimate engagement with the surfaces of the bevel gear carried by said structure.

4. In a transmission as defined in claim 2, said elements having base portions extending away from said further shaft and surfaces ancillary to the gear carried by said structure to be drivingly engaged by surfaces of said base portions.

5. In a transmission as defined in claim 4, surfaces moving with the bevel gear rotating with said further shaft to drivingly engage base surfaces of said elements.

6. In a transmission as defined in claim 1, a flywheel structure connected to and movable with the bevel gear rotating with said further shaft.

7. In a transmission as defined in claim 1, a raceway member forming a part of said structure and supporting said further shaft and the further gear mounted by said structure.

8. In a transmission as defined in claim 7, a spider bearing interposed between said driving and driven shafts and means for supporting the adjacent end of said further shaft by such bearing.

9. In a transmission as defined in claim 1, said structure providing a lubricant enclosure for all said gears, further shaft and elements whereby an oil torus is developed in advance of said elements.

10. In a transmission as defined in claim 8, the adjacent inner ends of said driving and driven shafts being supported and carried by said bearing.

11. In a transmission as defined in claim 4, a flange part extending angularly with respect to the teeth of the gear carried by said structure and furnishing the surfaces to be engaged by the base portions of said elements.

12. In a transmission as defined in claim 5, a further flange connected to and extending angularly with respect to the teeth of the gear rotating with such further shaft to also provide a surface to be engaged by the bases of said elements.

References Cited in the file of this patent

UNITED STATES PATENTS

| | | |
|---|---|---|
| 357,636 | Sharpneck | Feb. 15, 1887 |
| 1,409,864 | Jones | Mar. 14, 1922 |
| 1,775,741 | Thomas | Sept. 16, 1930 |
| 2,350,079 | Spalding | May 30, 1944 |
| 2,608,261 | Blazier | Aug. 26, 1952 |
| 2,874,591 | Thoma | Feb. 24, 1959 |
| 2,876,657 | Allin et al. | Mar. 10, 1959 |